United States Patent [19]

Milionis

[11] Patent Number: 4,699,655

[45] Date of Patent: Oct. 13, 1987

[54] PROCESS AND A PLANT FOR THE DIRECT REDUCTION OF IRON OXIDE PARTICLES IN A SHAFT FURNACE AND FOR SMELTING THE OBTAINED IRON SPONGE PARTICLES IN A MELTDOWN GASIFIER

[75] Inventor: Konstantin Milionis, Graz, Austria

[73] Assignees: Voest-Alpine Akt., Austria; Korf Engineering GmbH, Fed. Rep. of Germany

[21] Appl. No.: 799,947

[22] Filed: Nov. 20, 1985

[30] Foreign Application Priority Data

Nov. 26, 1984 [AT] Austria .................................. 3730/84

[51] Int. Cl.$^4$ ............................................. C21B 11/00
[52] U.S. Cl. ........................................ 75/38; 266/157; 266/160
[58] Field of Search .................... 266/157, 160; 75/38, 75/35, 34

[56] References Cited

U.S. PATENT DOCUMENTS

| | | | |
|---|---|---|---|
| 4,317,677 | 3/1982 | Weber et al. | 75/38 |
| 4,365,789 | 12/1982 | Scarlett et al. | 266/157 |
| 4,416,689 | 11/1983 | Collin | 75/34 |
| 4,597,771 | 7/1986 | Cheng | 266/160 |

FOREIGN PATENT DOCUMENTS 376241 10/1984 Austria .
3026949 2/1981 Fed. Rep. of Germany .
210310 6/1984 German Democratic Rep. .

Primary Examiner—Melvyn J. Andrews
Attorney, Agent, or Firm—Ostrolenk, Faber, Gerb & Soffen

[57] ABSTRACT

A process and a plant for the direct reduction of iron oxide particles in a shaft furnace and for smelting the obtained iron sponge particles in a meltdown gasifier. A coal fluidized bed is formed in the meltdown gasifier by supplying coal and oxygen-containing gas, in which the heat necessary to smelt the iron sponge particles as well as the reducing gas to be injected into the shaft furnace are produced. The top gas remaining after the reduction is drawn off the upper part of the shaft furnace and the dusty solid particles, which are discharged together with the reducing gas and/or with the top gas, are washed out by scrubbers. The suspension of the washed out solid particles is thickened and separated into a clear overflow and a concentrated coal slurry. The coal slurry is recycled into the meltdown gasifier, is pressure-gasified with oxygen and is burnt by burners arranged in the upper part of the meltdown gasifier and directed towards the coal fluidized bed.

8 Claims, 1 Drawing Figure

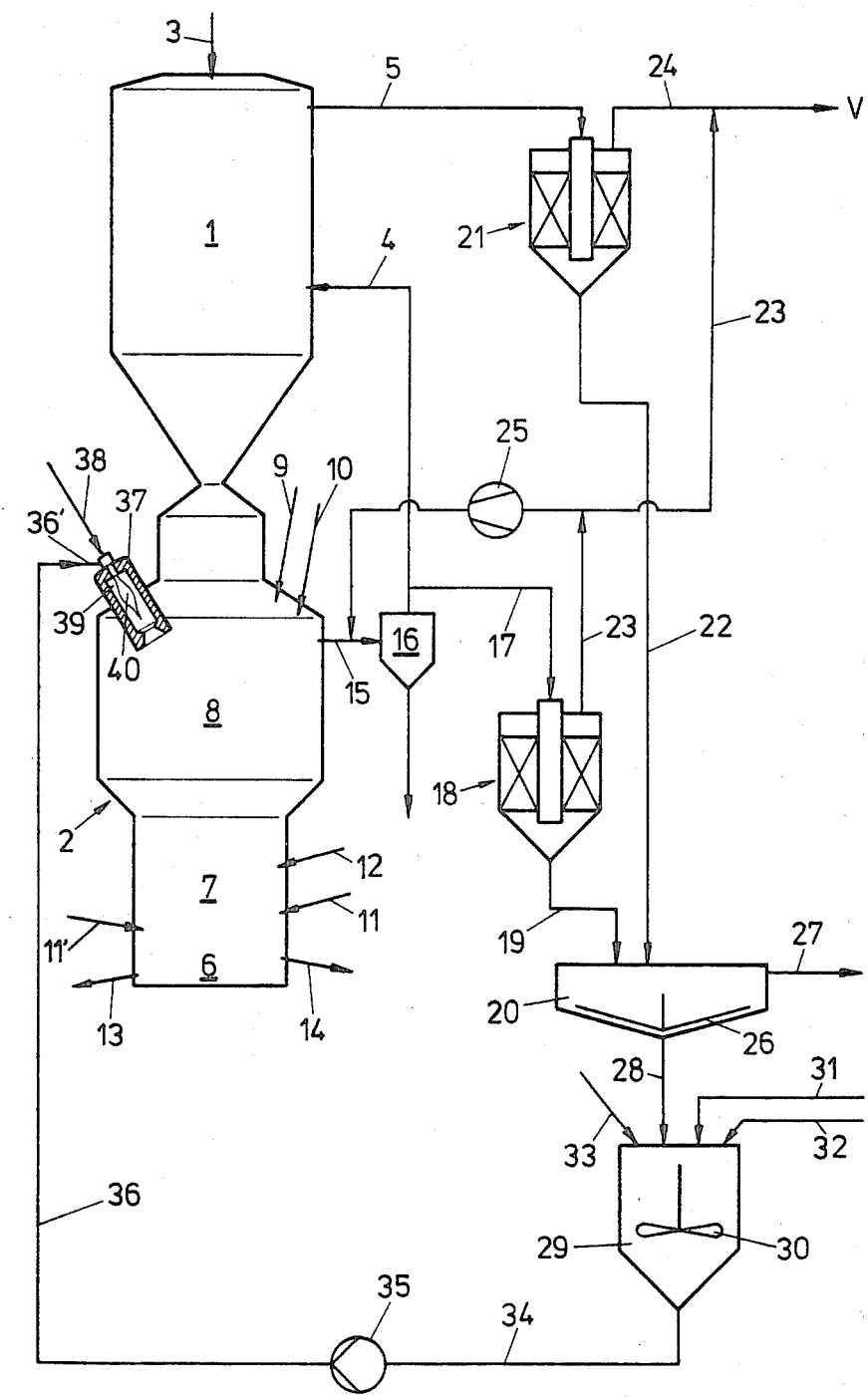

PROCESS AND A PLANT FOR THE DIRECT REDUCTION OF IRON OXIDE PARTICLES IN A SHAFT FURNACE AND FOR SMELTING THE OBTAINED IRON SPONGE PARTICLES IN A MELTDOWN GASIFIER

The invention relates to a process for the direct reduction of iron oxide particles in a shaft furnace and for smelting the obtained iron sponge particles in a meltdown gasifier, wherein a coal fluidized bed is formed in the latter by supplying coal and oxygen-containing gas, in which the heat necessary to smelt the iron sponge particles as well as the reducing gas to be injected into the shaft furnace are produced, and wherein the top gas remaining after the reduction is drawn off the upper part of the shaft furnace and the dusty solid particles substantially consisting of coal, which are discharged together with the reducing gas and/or with the top gas, are washed out, as well as to a plant for carrying out the process.

A process of this kind is described in Austrian Pat. No. 376,241. There, the solid matters separated from the reducing gas, and if desired, from the top gas by means of a hot cyclone or in scrubbers are agglomerated into shaped coke, which latter is again top-charged into the meltdown gasifier.

However, it has proved that the expenditures involved in briquetting are relatively high and that the temperature of the coal fluidized bed cannot be controlled to a sufficient degree, which may lead inter alia to the deposition of tarry components in the meltdown gasifier.

The invention aims at avoiding these disadvantages and difficulties and has as its object to achieve an optimum reaction of the raw matrials used with a simultaneous ncrease in the hydrogen portion of the reducing gas, to render possible an almost complete exploitation of the coal particles discharged by means of the gases and to raise the temperature of the reducing gas, without requiring binders for the dusts and without having to face the danger of operational failures and dust explosions.

In accordance with the invention, this object is achieved with a process of the initially defined kind in that the suspension of the washed out solid particles is thickened, separated into a clear overflow and a concentrated coal slurry, the coal slurry is recycled into the meltdown gasifier, is pressure-gasified with oxygen and is burnt by means of burners arranged in the upper part of the meltdown gasifier and directed towards the coal fluidized bed.

The mode of operation of coal dust gasification under pressure is known per se. Therein, a homogenous mixture of coal and water is produced, the suspension is brought to a high gasifying pressure by a pump, and the combustion of coal is effected by the supply of oxygen, with a temperature of about 1,500° C. being produced. The combustion takes place in a refractorily lined combustion space; the reaction within the flame proceeds very rapidly such that the dwell time in the combustion space takes few seconds only.

According to a preferred embodiment, the coal slurry, prior to pressure gasification, is adjusted to a solids concentration of from 50 to 80% by partial dehydration and/or by the addition of coal particles separated from the reducing gas and/or by the addition of fine coal.

The amount of the coal slurry recycled into the meltdown gasifier suitably may amount to 10 to 35% of the totally introduced coal.

Advantageously, the pressure gasification of the coal slurry is carried out at a pressure of from 2 to 10 bar.

The invention, furthermore, relates to a plant for carrying out the process of the invention, comprising a meltdown gasifier including a lower section for recieving molten metal, a central section for accommodating a coal fluidized bed and an upper killing section and equipped with supply ducts for introducing coal and nozzles injecting oxygen-containing gas as well as a discharge means for reducing gas formed, and comprising a shaft furnace provided with a supply duct for iron oxide particles and a supply means for reducing gas as well as with a discharge means for top gas, in which, if desired, a gas scrubber is installed. The plant is characterized in that there are provided:

(a) a gas scrubber in the reducing gas discharge means, for separating solid particles, (b) means for collecting and homogenizing the solid particles separated from the reducing gas an/or from the top gas, to form a suspension with a high concentration of solid particles, (c) a pump with a supply duct for supplying the solids suspension to the meltdown gasifier under elevated pressure, and (d) one or a plurality of burner means in the upper part of the meltdown gasifier, including an oxygen feed line.

According to a particular embodiment of the invention, a separating means is provided at the collecting means for the solid particles, to form a clear overflow and a concentrated coal slurry as underflow.

The burner means comprises at least one burner, each burner including a pressure duct for coal slurry and an oxygen line, which enter into a refractorily lined combustion space, the flame jet formed being directed downwardly onto the coal fluidized bed.

It has proved favorable that the meltdown gasifier and the shaft furnace constitute a structural unit.

BRIEF DESCRIPTION OF THE DRAWING

The sole FIGURE is a schematic illustration of the plant according to the invention.

The invention will now be explained in more detail by way of one exemplary embodiment and with reference to the accompanying drawing.

A direct reduction shaft furnace 1 and a meltdown gasifier 2 are combined into a structural unit. The reduction shaft furnace comprises an inlet 3 for iron oxide particles and an inlet 4 for reducing gas. Furthermore, the shaft furnace, in its upper part, includes a discharge duct 5 for the top gas remaining after the reduction.

The meltdown gasifier, which is integrally connected with the reduction shaft furnace, comprises a lower section 6 for molten metal and slag, a central section 7 for a coal fluidized bed, and a widened upper section 8, which serves as a killing space. In the meltdown gasifier, a supply duct 9 for coal and a supply duct 10 for fluxes are provided in the upper killing section 8, a supply duct 11 for coal is provided in the central section 7. In the border regin between the central section 7 and the lower section 6, the meltdown gasifier 2, furthermore, is provided with inlet nozzles 11' for oxygen-containing gas, from which only one is illustrated in the drawing. In the region of the central section 7, additional supply ducts 12 for water and hydrocarbons may be provided. Furthermore, a tap hole 13 for molten metal and a tap hole 14 for slag are provided in the lower part of the meltdown gasifier.

The upper killing section 8 comprises a discharge duct 15 for the reducing gas formed, which leads to a hot cyclone 16, from where the reducing gas partially freed from solid particles is guided into the shaft furnace via line 4. Another portion of the reducing gas is guided to the gas scrubber 18 via a line 17, where the remaining solid particles are washed out and, together with the washings, are guided to a collecting means 20 via a duct 19.

The top gas loaded from the discharge duct 5 of the reduction shaft furnace 1 with dusty solid particles substantially consisting of coal likewisely is guided to a gas scrubber 21, the suspension of washings and solid particles also being guided to the collecting means 20 via a duct 22.

A reducing gas freed from solid particles, from the scrubber 18, is supplied to a consuming station V as excess gas via a line 23, to which station excess gas also is supplied from the gas scrubber 21 via a line 24. Part of the excess gas coming from the gas scrubber 18 also may be returned to the hot cyclone 16 as a cooling gas via a compressor 25 and from there may be guided to the reducing gas inlet of the shaft furnace.

The coal particle suspension combined from the gas scrubber 21 and from the gas scrubber 18 is separated into a clear overflow 27 and a concentrated underflow, i.e., a concentrated coal slurry, in the collecting means 20, which comprises a separation or sedimentation means 26. The coal slurry is introduced into a homogenizing vessel 29 via a duct 28, which is equipped with an agitator 30. Into this homogenizing vessel, fine coal is introduced via a supply duct 31 and, if desired, fine lime is introduced via a supply duct 32. A further supply duct 33 is provided, through which the dust incurring in the hot cyclone 16 may be introduced into the homogenizing vessel.

The hightly concentrated coal slurry with a solids conten of from 50 to 80%, if necessary, after storage in a dosing tank (not illustrated), is supplied to a pump 35 via a duct 34, in which pump the coal slurry is adjusted to a pressure of from 2 to 10 bar. The coal slurry is then supplied to a combustion means 37 via a pressure line 36, which combustion means is comprised of one or a ring of burner(s) penetrating the wall or the killing space of the meltdown gasifier. These burners each include a pressure line 36' and an oxygen feed line 38, both entering into a refractorily lined combustion space 39. In the combustion space(s), the pressure gasification of coal dust takes place under the formation of a flame jet 40, which is directed downwardly onto the coal fluidized bed.

Suitably, the coal to be worked up by the process according to the invention is subdivided into a coarse grain fraction and a fine grain fraction. The coarse grain fraction is used for the formation of the coal or coke bed and is introduced via duct 9; the coarse grain fraction has a grain size of more than 3 mm. The fine grain portion is supplied to the homogenizing vessel 29 via duct 32; the fine grain portion has a grain size of less than 3 mm.

The advantages of the process according to the invention and of the plant described reside in that the solid particles separated in the cyclone 16 and in the gas scrubbers 18 and 21, which substantially consist of carbon, can be re-used without any further treatment, with a carbon conversion degree of up to 99% being attained, and in that a favorable temperature profile is developed in the meltdown gasifier; in the killing space or section of the meltdown gasifier, higher temperatures than so far are attained, thus also reaching a better preheating of the materials top-charged into the meltdown gasifier, i.e., coal, fluxes and iron sponge. A further advantage consists in that the undesired separation of tar and tarry components is prevented due to the higher temperature prevailing in the killing space of the meltdown gasifier.

What I claim is:

1. A process for the direct reduction of iron oxide particles in a shaft furnace and for smelting the obtained iron sponge particles in a meltdown gasifier, which process comprises the steps of forming a coal fluidized bed in a meltdown gasifier by supplying coal and oxygen-containing gas, so as to produce the heat required for smelting iron spronge particles and forming a reducing gas, discharging said reducing gas from said meltdown gasifier together with dusty solid particles substantially consisting of coal, and injecting said reducing gas into a shaft furnace, for reducing iron oxide particles to iron sponge particles, drawing off top gas from the upper part of said shaft furnace together with dusty solid particles substantially consisting of coal.

washing out said dusty solid particles from said reducing gas and said top gas so as to obtain a suspension, thickening said suspension and separating said suspension into a clear overflow and a concentrated coal slurry, recycling said coal slurry into said meltdown gasifier, pressure-gasifying said coal slurry with oxygen and burning said coal slurry by burner means arranged in the upper part of said meltdown gasifier so as to be directed towards said coal fluidized bed.

2. A process as set forth in claim 1, whereins aid coal slurry is adjusted to a solids concentration of from 50 to 80% prior to pressure-gasifying said coal slurry with oxygen by at least one of a partial dehydration, an addition of coal particles separated from said reducing gas and an addition of fine coal.

3. A process as set forth in claim 1, wherein pressure-gasifying of said coal slurry with oxygen is effected at a pressure of from 2 to 10 bar.

4. A process as set forth in claim 1, wherein said coal slurry is introduced in an amount of from 10 to 35% of the total coal.

5. In a plant for the direct reduction of iron oxide particles in a shaft furnace and for smelting the obtained iron sponge particles in a meltdown gasifier, which meltdown gasifier is composed of a lower section adapted to receive molten metal, a central section for accommodating a coal fluidized bed and an upper killing section, and includes supply ducts for introducing coal and nozzles for injecting oxygen-containing gas as well as a reducing gas discharge duct for discharging reducing gas formed, and which shaft furnace is provided with a first inlet for iron oxide particles and a second inlet for reducing gas as well as with a top-gas discharge duct including a first gas scrubber for wet-separating dusty solid particles substantially consisting of coal from said top gas, the improvement comprising a second gas scrubber provided in said reducing-gas discharge duct for wet-separating dusty solid particles substantially consisting of coal from said reducing gas, means for collecting and homogenizing said dusty solid particles wet-separated from at least one of said reducing gas and said top gas so as to form a suspension having a high concentration of solid particles, a pump including supply means for supplying said suspension to said meltdown gasifier under elevated pressure, and at least one burner means provided in said upper section of said meltdown gasifier and including an oxygen feed line including a first gas scrubber for wet-separating dusty solid particles substantially consisting of coal from said top gas.

6. A plant as set forth in claim 5, further comprising separatng means provided at said collecting means for said solid particles and adapted to form a clear overflow and a concentrated coal slurry.

7. A plant as set forth in claim 6, wherein said at least one burner means is comprised of at least one burner including a pressure line for said coal slurry and said oxygen feed line, and further comprising a refractorily lined combustion space adapted to receive said pressure line and said oxygen feed line so as to form a flame jet within said combustion space, the flame jet being directed downwardly towards said coal fluidized bed.

8. A plant as set forth in claim 5, wherein said meltdown gasifier and said shaft furnace constitute a structural unit.

* * * * *